P. A. HENNING, Jr.
STANCHION.
APPLICATION FILED AUG. 22, 1919.

1,408,294.

Patented Feb. 28, 1922.

WITNESS:
L. B. James

P. A. Henning, Jr.
INVENTOR.

BY
Victor J. Evans
ATTORNEY.

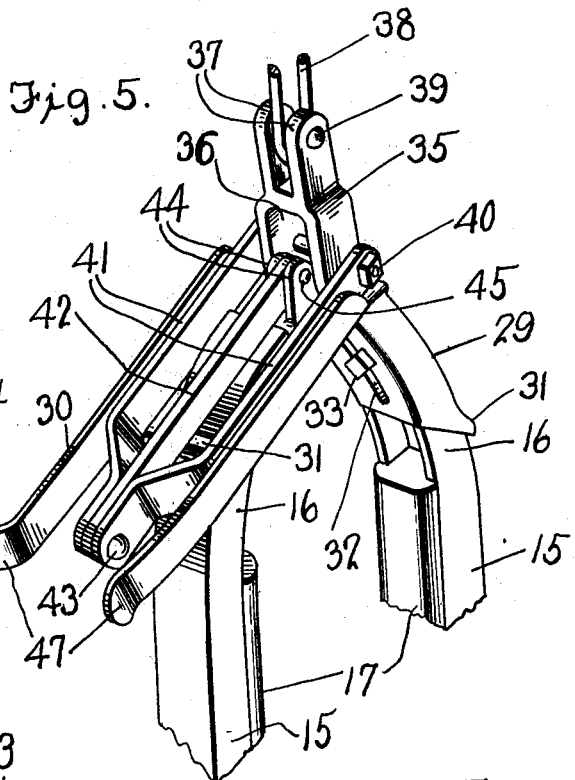
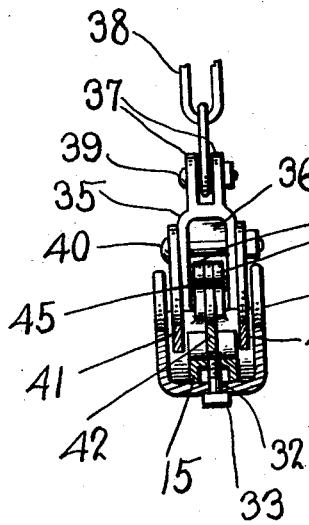
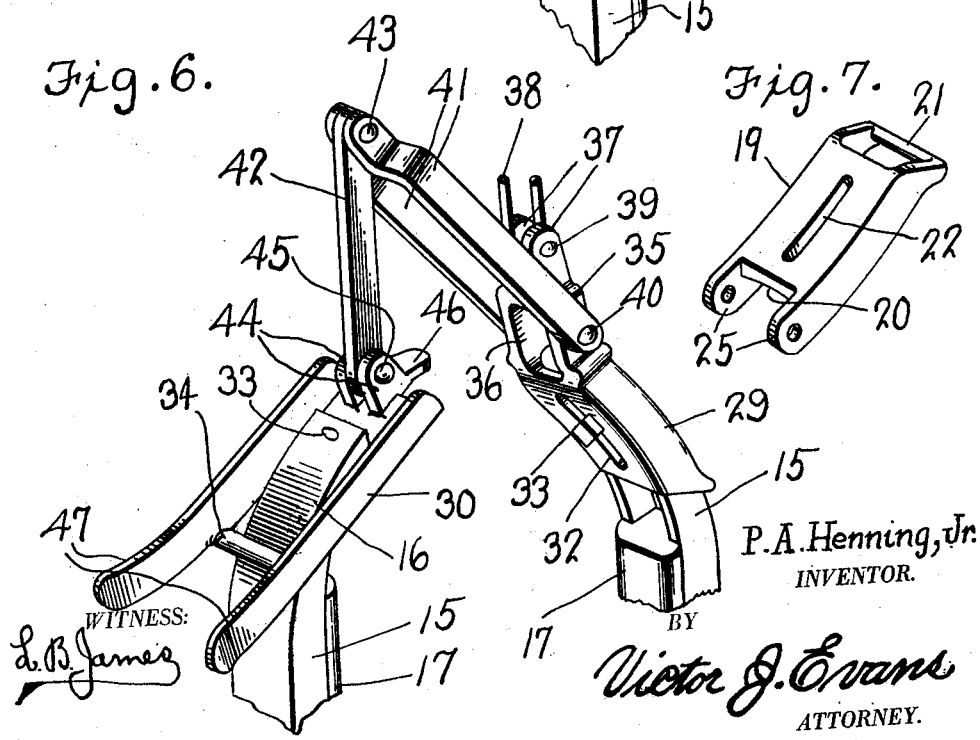

UNITED STATES PATENT OFFICE.

PETER A. HENNING, JR., OF ZUMBROTA, MINNESOTA, ASSIGNOR TO MOYER MANUFACTURING COMPANY, OF MONTEVIDEO, MINNESOTA.

STANCHION.

1,408,294.  Specification of Letters Patent.  Patented Feb. 28, 1922.

Application filed August 22, 1919. Serial No. 319,187.

*To all whom it may concern:*

Be it known that I, PETER A. HENNING, Jr., a citizen of the United States, residing at Zumbrota, in the county of Goodhue and State of Minnesota, have invented new and useful Improvements in Stanchions, of which the following is a specification.

This invention relates generally to stable appliances, and particularly to stanchions having a pair of bars pivotally connected together at one of their ends in order to permit one of them to be moved outwardly from the other and provided at their other ends with locking means for holding them in relative closed position, the primary object of the invention being to provide an improved form of locking means capable of being placed in locking position automatically upon the relative closing movement of the side bars and when locked to be guarded so that it cannot be accidentally released by the animal engaged by the stanchion.

It is a still further object of the invention to produce a device of this character which shall be of a comparatively simple construction, cheap to manufacture, and thoroughly efficient for the purposes for which it is devised.

Other objects and advantages will appear as the nature of the invention is better understood, reference being had to the accompanying drawings, in which:

Figure 4 is a sectional view approximately on the line 4—4 of Figure 3;

Figure 5 is a perspective view showing the upper portion of the stanchion locked;

Figure 6 is a similar view showing the upper portion of the stanchion released, prior to the movement of the parts to the position illustrated in Figure 2;

Figures 7 and 8 illustrate castings employed in connecting the lower ends of the side bars of the stanchion.

Figure 1:
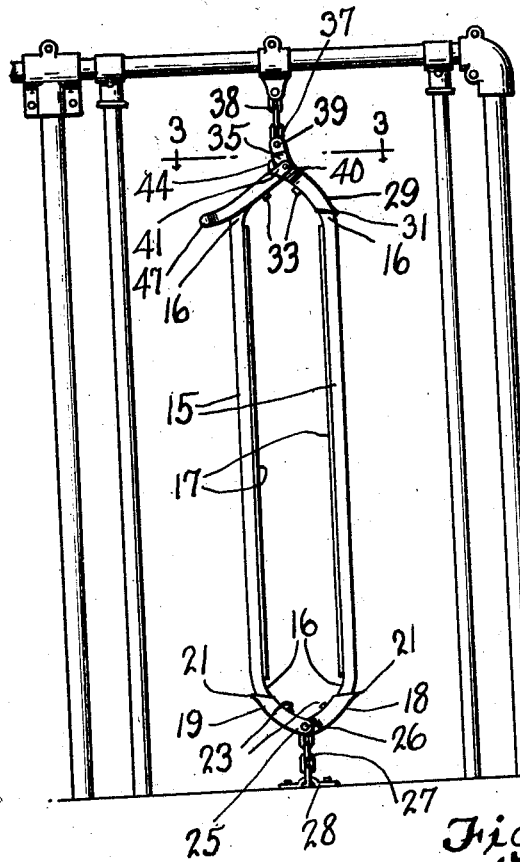
Figure 1 is a view illustrating a stanchion constructed in accordance with this invention, in its closed position.
Figure 2:
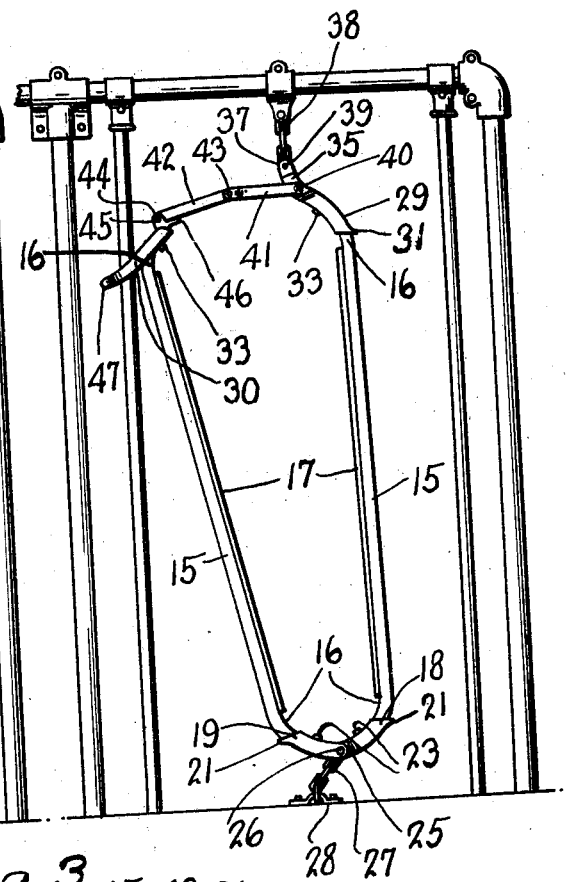
Figure 2 is a similar view but showing the stanchion in its open position.
Figure 3:
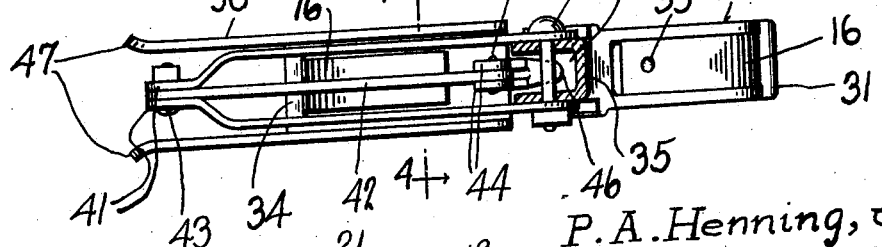
Figure 3 is a sectional view approximately on the line 3—3 of Figure 1.
Figure 8:
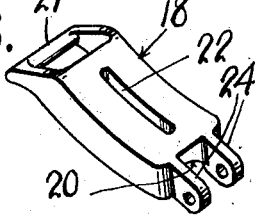

The side bars 15 of the stanchion are preferably constructed of channeled irons, and have their opposite ends incurved, as indicated by the numerals 16. When the channels are arranged upon the inner faces or portions of the side bars, there is secured in the said channels wooden fillers 17, so as to protect the animal engaged by the stanchion, but, when the channels are arranged upon the outer sides of the side bars no such fillers are necessitated.

The incurved ends 16 of the members 15, at the lower portions of the said members have each secured thereon castings, the castings for one of the members being indicated by the numeral 18 and the casting for the other member by the numeral 19. These castings are curved longitudinally and conform to the shape of the ends of the bars 15 and are depressed from one of their faces as indicated by the numerals 20, the side members provided by the depressions being bridged as at 21 at what may be termed the outer ends of the castings, and through the spaces between the bridges and the remainder of the castings the ends of the bars 15 are passed. The castings are provided with elongated slots 22 and through these slots pass the shanks of headed members 23, the threaded ends of the said members entering threaded openings in the curved ends 16 of the bars 15. By this arrangement it will be seen that the castings 18 and 19 may be adjusted inwardly or outwardly of the bars. The castings 18 and 19, at their outer ends are provided with spaced ears 24 and 25 respectively, the ears 24 of the casting 18 being received between the ears 25 of the casting 19, and a pivot 26 passes through alined openings in the ears. Between the ears of the casting 18 and engaged by the pivot 26 is one link of a chain 27 that is secured to a staple or bracket 28 in the bottom of the stall.

On the upper curved ends 16 of the bars 15 are secured longitudinally curved castings somewhat similar to those just described and indicated by the numerals 29 and 30 respectively. The casting 29 has its outer face hollow, and its outer edge is bridged as at 31. The inner and closed faces of the castings are provided with elongated slots 32, and through these slots pass the threaded shanks of threaded members 33 that engage in threaded openings in the curved upper ends 16 of the bars 15. By this arrangement it will be seen that the castings 29 and 30 are adjustably connected to the bars. The casting 30 has its outer face hollow and its outer or lower end provided with a bridge piece 34 similar to the bridge piece 31 of the casting 29. The curved ends of the bars 16 pass through the spaces between the bridge pieces and the closed faces of the castings.

The casting 29 has its upper or inner end provided with a flat portion which may be termed a head 35 having a socket portion 36 and laterally extending spaced ears 37. Between the ears is arranged the lower link of a suspending chain 38, the said link being retained between the said ears by a bolt or pivot 39. Passing transversely through the vertical walls of the socket 36 is a pin 40 to which the ends of a pair of links 41 are pivoted. The links 41 have their other ends offset inwardly toward each other and are connected together and to one end of an additional link 42 by a pivot 43. The link 42 has its other end pivoted between ears 44 formed on the inner end of the depressed or channeled casting 30 by means of a pivot 45. The casting 30 is provided at its inner end with a longitudinally extending tongue 46 arranged adjacent the ears 44, and this tongue is designed to be received in the socket 36, when the links are swung together, that is, when the link 42 is swung between the links 41. This movement of the links arranges the links 41 between the side members of the casting 30 with the link 42 disposed between the links 41 and centrally of the casting. The casting 30, outwardly of the bridge piece heretofore referred to has its sides extended to provide spaced projections 47 which straddle the bar at the adjacent side of the stall when the stanchion is open to prevent lateral swing of the stanchion. When the side bars are closed and locked as above described the pivot 43 will be arranged a considerable distance below the pivot 40, so that a direct outward pull between the bars 15 can not release the lock, it being necessary for the connected ends of the links to be grasped and the said links swung outwardly as indicated in certain figures of the drawings. When the device is in locked position the casting 30 protects the adjustable lock provided by the links 42 and 41 from contacting engagement by the animal held by the stanchion as will, it is thought, be readily understood. When the stanchion is open the link 42 rests upon the tongue 46 so as to hold the pivot 43 slightly above the line between the pivots 40 and 45. The locking of the side bars is thus effected automatically as the bar carrying the casting 30 is moved to closed position. The outward movement of the side bars is limited by the links, especially when the stall is not provided with a bar which the member 30 can engage.

The inturned ends 16 of the bars 15 and the castings 18, 19, 29 and 30 (which constitute extension members) having longitudinally curved contacting portions, provide for an adjustment of the bars 15 toward and away from each other without appreciably changing the length of the stanchion, or without appreciably changing the distance between the pivots 26 and 40. This feature is important since the stanchion is suspended between its support at approximately the same tension irrespective of its lateral adjustment.

Having thus described the invention, what is claimed as new, is:—

1. A device of the class described comprising a pair of spaced side bars pivotally connected together at one of their ends, a member carried at the other end of one of said bars and having a channel in its outer side, and pivotally connected links pivotally connected to the other end of the other bar and to said member, said links being folded alongside of each other and disposed in said channel when said bars are closed and unfolded in substantially longitudinal alinement with each other when said bars are opened.

2. A device of the class described comprising a pair of spaced side bars hingedly connected together at one of their ends, a pair of pivotally connected links pivotally connected to the other ends of said bars and folded alongside of each other with their pivotal connection with each other passed beyond the dead center between their pivotal connections with said bars when said bars are in relatively closed position whereby to hold the latter in this position, said links being capable of being swung into substantially longitudinal alinement upon the outward movement of one bar with respect to the other, and means carried by one of said bars for limiting this swinging movement of said links and positioning their pivotal connection with each other in advance of the line between their pivotal connections with said bars whereby said links will be relatively folded when said bars are moved to relatively closed position.

3. A device of the class described comprising a pair of spaced side bars hingedly connected together at one of their ends, a pair of pivotally connected links pivotally connected to the other ends of said bars and folded alongside of each other with their pivotal connection with each other passed beyond the dead center between their pivotal connections with said bars when said bars are in relatively closed position whereby to hold the latter in this position, said links being capable of being swung into substantially longitudinal alinement upon the outward movement of one bar with respect to the other, the last mentioned end of one of said bars being provided with a recess, and a tongue projecting from the last mentioned end of the other bar and adapted to fit into said recess when said bars are in relatively closed position to prevent lateral shifting of the same, said tongue limiting the above mentioned swinging movement of said links and positioning their pivotal connection with each other in advance of the line between their pivotal connections with said bars whereby said links will be relatively folded when said bars are moved to relatively closed position.

4. A device of the class described comprising a pair of spaced side bars hingedly connected together at one of their ends, members carried upon the other ends of said bars, one of said members having a channel on its outer side, a tongue projecting inwardly from one of said members and the other member having a recess to receive said tongue when said bars are in relative closed position whereby to prevent lateral shifting of said bars, a link pivoted at one end to one member, a second link pivoted at one end to the other member and at its other end to the first link, said second link being composed of a pair of spaced sections disposed on each side of the first link, said links being folded alongside of each other and confined in said channel with their pivotal connection with each other passed beyond the dead center between their pivotal connections with said members when said bars are in relatively closed position whereby to hold the latter in this position, said links being capable of being swung outwardly out of said channel into substantially longitudinal alinement upon the outward movement of one bar with respect to the other and one of them being engaged by said tongue to limit this swinging movement and to position their pivotal connection with each other in advance of the line between their pivotal connections with said members whereby said links will be relatively folded when said bars are moved to closed position.

In testimony whereof I affix my signature.

PETER A. HENNING, Jr.